(12) United States Patent
Scholz et al.

(10) Patent No.: US 8,833,295 B2
(45) Date of Patent: Sep. 16, 2014

(54) MASKING ARTICLE FOR PRODUCING PRECISE PAINT LINES AND METHOD OF IMPROVING PAINT LINE PERFORMANCE OF MASKING ARTICLES

(71) Applicant: 3M Innovative Properties Company, St. Paul, MN (US)

(72) Inventors: Matthew T. Scholz, Woodbury, MN (US); Brian E. Spiewak, Inver Grove Heights, MN (US); Roy Wong, White Bear Lake, MN (US); Thomas E. Wood, Stillwater, MN (US); Robin E. Wright, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/739,956

(22) Filed: Jan. 11, 2013

(65) Prior Publication Data

US 2013/0118402 A1    May 16, 2013

Related U.S. Application Data

(63) Continuation of application No. 12/776,743, filed on May 10, 2010, now abandoned.

(60) Provisional application No. 61/177,574, filed on May 12, 2009.

(51) Int. Cl.
*B05C 11/00* (2006.01)
*B05C 21/00* (2006.01)
*B32B 43/00* (2006.01)
*B05B 15/04* (2006.01)

(52) U.S. Cl.
CPC ........... *B05C 21/005* (2013.01); *B05B 15/0456* (2013.01); *C09J 2203/30* (2013.01); *C09J 2203/31* (2013.01)

USPC ............................. 118/505; 428/192; 428/98

(58) Field of Classification Search
CPC ...... C09J 7/02; C09J 2433/00; C09J 2203/31; C09J 2400/283

See application file for complete search history.

(56) References Cited

U.S. PATENT DOCUMENTS

| | | | |
|---|---|---|---|
| 1,683,453 | A | 9/1928 | Farrell |
| 2,045,597 | A | 6/1936 | Haug |

(Continued)

FOREIGN PATENT DOCUMENTS

| | | |
|---|---|---|
| DE | 296 17 896 U1 | 1/1997 |
| EP | 0 558 207 A2 | 9/1993 |

(Continued)

OTHER PUBLICATIONS

Monroe et al, A Perspective on Solubility Rules, Oct. 1984, vol. 61 No. 10, p. 885 (page included).*

(Continued)

*Primary Examiner* — Dah-Wei D Yuan
*Assistant Examiner* — Jethro Pence
(74) *Attorney, Agent, or Firm* — David B. Patchett

(57) ABSTRACT

An adhesive masking article for shielding a protected work surface from a coating applied to a surface adjacent the protected work surface includes a backing layer having first and second opposed major surfaces, and at least one edge, an adhesive on at least a portion of at least one of the first and second backing layer opposed major surfaces, and a barrier inducing treatment on at least an edge surface of the masking article to contact the coating when the coating contacts the edge of the backing layer, thereby causing a barrier to form along the edge of the masking article that impedes the migration of the coating past the edge of the masking article beneath the masking article.

14 Claims, 1 Drawing Sheet

(56) References Cited

U.S. PATENT DOCUMENTS

| | | | |
|---|---|---|---|
| 2,589,674 A | 3/1952 | Cook |
| 2,626,876 A | 1/1953 | Carnes |
| 3,055,496 A | 9/1962 | Dunlap |
| 3,347,362 A | 10/1967 | Rabuse |
| 3,752,304 A | 8/1973 | Alef |
| 4,033,803 A | 7/1977 | Coder |
| 4,181,711 A | 1/1980 | Ohashi et al. |
| 4,313,970 A | 2/1982 | Jones et al. |
| 4,341,828 A | 7/1982 | Stephens |
| 4,374,883 A | 2/1983 | Winslow |
| 4,397,905 A | 8/1983 | Dettmer et al. |
| 4,420,520 A | 12/1983 | Jones et al. |
| 4,703,997 A | 11/1987 | Ijiri |
| 4,728,568 A | 3/1988 | Sasada et al. |
| 4,738,894 A | 4/1988 | Borde |
| 4,751,108 A | 6/1988 | Larimore et al. |
| 4,781,957 A | 11/1988 | Brown et al. |
| 4,798,201 A | 1/1989 | Rawlings |
| 4,837,070 A | 6/1989 | Weber et al. |
| 4,867,526 A | 9/1989 | Arroyo |
| 4,946,728 A | 8/1990 | Ikeda et al. |
| 5,234,517 A | 8/1993 | Pape et al. |
| 5,260,097 A | 11/1993 | Silvestre |
| 5,290,615 A | 3/1994 | Tushaus et al. |
| 5,356,503 A | 10/1994 | Caryford et al. |
| 5,385,783 A | 1/1995 | Patel et al. |
| 5,415,923 A | 5/1995 | Sarokin et al. |
| 5,468,538 A | 11/1995 | Nameche |
| 5,472,559 A | 12/1995 | Cayford et al. |
| 5,571,601 A | 11/1996 | Skoufis et al. |
| 5,640,827 A | 6/1997 | Van Someren et al. |
| 5,806,271 A | 9/1998 | Van Someren et al. |
| 5,902,678 A | 5/1999 | Konda et al. |
| 5,908,619 A | 6/1999 | Scholz |
| 5,958,580 A | 9/1999 | Kohno et al. |
| 6,025,045 A | 2/2000 | Langeman |
| 6,048,610 A | 4/2000 | St. Coeur et al. |
| 6,129,964 A | 10/2000 | Seth |
| 6,136,371 A | 10/2000 | Fidan et al. |
| 6,579,587 B2 | 6/2003 | Schnoebelen, Jr. |
| 6,582,711 B1 | 6/2003 | Asmus et al. |
| 6,623,825 B2 | 9/2003 | Wong |
| 6,793,998 B1 | 9/2004 | Silvestre |
| 6,828,008 B2 | 12/2004 | Gruber |
| 6,962,748 B2 | 11/2005 | Nickel |
| 6,984,438 B1 | 1/2006 | Nickel |
| 7,344,771 B2 | 3/2008 | Kubo |
| 2001/0001047 A1 | 5/2001 | Nelson et al. |
| 2001/0023003 A1 | 9/2001 | Langeman |
| 2002/0045020 A1 | 4/2002 | Iwen |
| 2003/0194558 A1 | 10/2003 | Anderson |
| 2008/0318038 A1 | 12/2008 | Fucito |
| 2009/0280301 A1* | 11/2009 | Tynan et al. ............... 428/192 |
| 2010/0218781 A1* | 9/2010 | McNamara et al. ......... 132/200 |

FOREIGN PATENT DOCUMENTS

| | | |
|---|---|---|
| EP | 0 769 585 A2 | 4/1997 |
| EP | 0 795 357 A1 | 9/1997 |
| EP | 0 999 251 B1 | 5/2000 |
| EP | 1 059 386 A1 | 12/2000 |
| EP | 1 149 634 B1 | 10/2001 |
| EP | 1 162 248 B1 | 12/2001 |
| EP | 1769852 | 4/2007 |
| GB | 2 256 219 A | 2/1992 |
| JP | 53118440 | 10/1978 |
| JP | S56-30483 | 3/1981 |
| JP | S60-229975 A | 3/1981 |
| JP | 58038776 | 3/1983 |
| JP | 59043083 A | 3/1984 |
| JP | S59-47279 | 3/1984 |
| JP | 59-159874 A | 9/1984 |
| JP | 60-118775 A | 6/1985 |
| JP | S62-115079 A | 5/1987 |
| JP | H2-274783 | 11/1990 |
| JP | S63-37356 | 9/1991 |
| JP | S63-264689 A | 10/1991 |
| JP | H4-50161 | 2/1992 |
| JP | 5-068919 | 3/1993 |
| JP | 5-302069 | 11/1993 |
| JP | H6-87978 | 3/1994 |
| JP | 6238209 | 8/1994 |
| JP | 6-269708 | 9/1994 |
| JP | 6-296910 | 10/1994 |
| JP | H7-148201 | 6/1995 |
| JP | H7-292330 | 11/1995 |
| JP | 08-020762 A | 1/1996 |
| JP | 08-120251 A | 5/1996 |
| JP | 8-261569 | 10/1996 |
| JP | H9-221647 A | 8/1997 |
| JP | H10-140114 | 5/1998 |
| JP | 11-190558 A | 7/1998 |
| JP | 10-237396 | 9/1998 |
| JP | H10-235277 | 9/1998 |
| JP | H10-306261 | 11/1998 |
| JP | 10-316944 | 12/1998 |
| JP | 2000-063772 | 2/2000 |
| JP | 2000-110999 A | 4/2000 |
| JP | 2000-157323 A | 6/2000 |
| JP | 2000-218204 | 8/2000 |
| JP | 2000-290608 | 10/2000 |
| JP | 2000-309763 | 11/2000 |
| JP | 2002-020707 | 1/2002 |
| JP | 3593144 | 11/2004 |
| JP | 2005-225140 A | 8/2005 |
| JP | 2006-225140 | 8/2006 |
| JP | 2008-678 A | 1/2008 |
| WO | WO 98/55280 | 12/1998 |
| WO | WO 99/18166 | 4/1999 |
| WO | WO 99/48618 | 9/1999 |
| WO | WO 00/15727 | 3/2000 |
| WO | WO 01/03854 A1 | 1/2001 |
| WO | WO 01/23479 A1 | 4/2001 |

OTHER PUBLICATIONS

PCT International Search Report.
PCT Written Opinion of the International Searching Authority.
Product Literature: Tartan™ Brand No. 200, Minnesota Mining & Manufacturing Company (3M), Masking Tape, Apr. 1995, 2 pages.
Product Literature: 3M 202 Masking Tape, Minnesota Mining & Manufacturing Company (3M), Product Data Sheet, Mar. 1996, 2 pages.
Product Literature: Scotch™ 2364 Paint Masking Tape (Asia/Pacific), Minnesota Mining & Manufacturing Company (3M), Technical Data, 1522, Sep. 1, 1998, 3 pages.
Product Literature: 3M 2368 High Performance Masking Tape, Minnesota Mining & Manufacturing Company (3M), Product Data Sheet, Mar. 1996, 3 pages.
Product Literature: Nitto Denko Corporation, Environmental Report, 2001 "Working in Harmony with the Environment," pp. 1-27.
Smith, Merrily A.; Jones, Norvell M.M.; Page, Susan L.; and Dirda, Marian Peck; Pressure-Sensitive Tape and Techniques for Its Removal From Paper; JAIC 1984, vol. 23, No. 2, Article 3, pp. 101-113.
Skeist, Irving, Editor, Handbook of Adhesives, Second Edition, 1977; Bemmels, C. W., Pressure-Sensitive Tapes and Labels, pp. 724-735.
FORM 20-F, Intertape Polymer Group Inc—ITPOF, Annual Report, Filed: May 28, 1999 (period: Dec. 31, 1998), Morningstar® Document Research$^{SM}$.

* cited by examiner

MASKING ARTICLE FOR PRODUCING PRECISE PAINT LINES AND METHOD OF IMPROVING PAINT LINE PERFORMANCE OF MASKING ARTICLES

CROSS REFERENCE TO RELATED APPLICATION

This application is a continuation of U.S. patent application Ser. No. 12/776,743, filed May 10, 2010; which claims the benefit of U.S. Provisional Patent Application No. 61/177,574, filed May 12, 2009, the disclosure of which is incorporated by reference herein in its entirety.

BACKGROUND

The present disclosure relates generally to masking articles, such as masking tape, and, more particularly, to a masking article that produces precise paint lines.

When applying a surface coating, such as paint or stain, to a surface, care must be taken so that the paint does not get on the surfaces adjacent to the surface to be painted. This can be accomplished by carefully painting the surface, or by masking off the area around the surface to be painted. Masking articles, such as masking tapes and adhesive masking sheets, are often used to protect the area adjacent to the surface being painted. When using such masking articles, it is generally desirable that the paint not bleed past the demarcation line defined by the edge of the masking article. In this manner, the masking article will produce a paint line between the painted surface and unpainted surface that is smooth and consistent, and precisely matches the line intended by the user. Depending on a number of factors, such as how well such masking articles are applied to the surface, the energy of the surface, and the texture of the surface to which such masking articles are applied, paint may flow beyond the edge of the masking article and under certain regions of the masking article, thereby producing an imprecise paint line.

Adhesive tapes and masking materials having an edge coating for improving the masking ability of the materials are known in the prior art. U.S. Pat. No. 6,828,008 (Gruber), for example, discloses an absorbent edge coating for masking tape and other masking materials. The masking tape comprises a substrate having a top surface, a bottom surface, and at least one masking edge. The bottom surface of the substrate has an adhesive layer applied thereto. An absorbent edge coating is applied to at least one masking edge of the substrate so as to at least substantially prevent liquids addressed to the at least one coated masking edge from being absorbed into the substrate of the tape and from passing between the bottom surface of the tape and a surface to which the tape has been applied.

SUMMARY

Previous attempts to develop masking articles that impede the migration of paint past the edge of the masking article suffer from a number of drawbacks and disadvantages. For example, known adhesive masking articles may include the use of ingredients that are difficult to apply to the masking article during the manufacturing process, may require expensive packaging to maintain their effectiveness, may be harmful if ingested, and/or may cause skin, eye and nose irritation, which may require warnings and/or special handling instructions, or may produce unintended and undesirable effects at either the interface of the masking article and the paint, or on the surface to be painted.

More specifically, known masking articles may include superabsorbent polymers (SAPs), such as sodium polyacrylate. Superabsorbent polymers, however, are difficult to integrate into existing tape manufacturing processes due, in part, to their insoluble particulate nature. For example, such superabsorbent polymers may be provided as dry powders, which require the use of special equipment to be applied to the masking article during production, or they may be provided as liquids, which must be applied to the masking article and then subsequently dried in an additional processing step to form a superabsorbent layer. Masking articles including superabsorbent polymers also require special and costly packaging to protect the superabsorbent polymer from being exposed to moisture, which interferes with the absorbency of the superabsorbant polymer and, therefore, interferes with the effectiveness of such materials. That is, if the masking article is not consistently kept in its protective packaging, it may not work as well due to exposure to ambient humidity. SAPs may also be irritants. As a result, users of masking articles including SAPs must wash skin that is exposed to SAPs, and must be careful not to allow the material to get into their eyes or nose.

In addition, because of their absorbency, when masking articles including superabsorbent polymers are used in paint masking applications, an undesirable raised region, or ridge, of paint is often created along the edge of the masking article. This raised region generally takes longer to dry, and is therefore more susceptible to damage prior to fully drying. In addition, loose or excess SAP may fall onto the surface to be painted. SAP on the surface to be painted may, in turn, interfere with the application of paint to the surface (i.e., it may create an unsightly blotchy appearance in the paint).

The need exists for an adhesive masking article that addresses the limitations in the field. More particularly, the need exists for an adhesive masking article for paint masking that is easy to make, does not require special packaging, is safe and easy to use, and produces sharp, clean, precise, smooth, even paints lines. The terms "sharp", "clean", "precise", "smooth" and "even", when used to describe a paint line, generally refer to a paint line that corresponds to the edge of the masking article. That is, a sharp, clean, precise, smooth, or even paint line is one in which the paint does not extend significantly beyond the edge of the masking article so as to penetrate under the masking article. Thus, when the masking article is laid down straight, a "sharp", "clean", "smooth", or "even" paint line would be straight with minimal or no paint bleed under the article (i.e., little or no paint flow between the masking article and masked surface).

The need also exists for a masking article in roll form with improved paint line performance that does not adhere to or otherwise damage surfaces upon which the roll may be placed. That is, the exposed outer surfaces of the tape roll, including both the tape backing and the side surfaces of the roll defined by the tape edges, should not damage any surface that the roll of tape may be placed.

In one embodiment, the present disclosure provides an adhesive masking article for shielding a protected work surface from a coating applied to a surface adjacent the protected work surface including a backing layer having first and second opposed major surfaces, and at least one edge, an adhesive on at least a portion of at least one of the first and second backing layer opposed major surfaces, and a cationic barrier inducing treatment including a water soluble cationic compound present on at least the edge of the masking article to contact the coating when the coating comes into contact with the edge of the backing layer.

In another embodiment, the present disclosure provides an adhesive masking article for shielding a protected work surface from a coating applied to a surface adjacent the protected work surface including a backing layer having first and second opposed major surfaces, and at least one edge, an adhesive on at least a portion of at least one of the first and second backing layer opposed major surfaces, and a polycationic barrier inducing treatment present on at least the edge of the masking article to contact the coating when the coating comes into contact with the edge of the backing layer.

In other aspects, the barrier inducing compound may have a solubility in water of at least about 0.1, 0.2, 0.5, 1, 2, 5, 10, or 20 grams/100 grams of deionized water at 23° C., the barrier inducing treatment may comprise a cationic compound having at least one of 2 amine groups, a metal cation having a valency of at least 2, and a combination thereof, the cationic material may have an amine equivalent weight of at least about 40 g/equivalent, and no greater than about 1000 g/equivalent, the cationic compound may comprise a polyvalent metal cation, the barrier inducing compound may comprise at least one of a cationic polymer and a cationic oligomer, and/or the cationic polymer may comprise an organic polymer.

In other aspects, the polycationic barrier inducing treatment may comprise a crosslinked organic polycationic polymer derived from vinyl monomers, the polycationic polymer may comprise at least one of Polyquaternium-6 and Polyquaternium-37, the polycationic polymer may comprise at least one of a polyquaternary amine polymer and a polyfunctional protonated primary, secondary, or tertiary amine, or a combination thereof, the polycationic polymer may comprise at least one of poly(diallyldimethylammonium salt), protonated or quaternized homo- or copolymer of an amine functional acrylic monomer, and protonated polyethylene imine, and/or the amine functional acrylic monomer may comprise at least one of acrylates, methacrylates, acrylamides, and methacrylamides, the acrylic monomer may be selected from diallyldimethylammonium salt, methacryloyloxyalkyl trialkyl ammonium salt, acryloyloxyalkyl trialkyl ammonium salt, quaternized dialkylaminoalkylacrylamidine salt, trialkylaminoalkyl acrylate and methacrylate salts, dialkyldiallyl ammonium salts (e.g., dimethyldiallylammonium salts), acrylamidoalkyltrialkyl salts, methacrylamidoalkyltrialkyl salts, and alkyl imidazolinium salts.

In further aspects, the barrier inducing treatment may comprise an inorganic compound, the inorganic compound may comprise a polyvalent metal compound, the polyvalent metal compound may comprise a metal salt, and/or the metal salt may comprise a soluble salt of aluminum, iron, zirconium, chromium, cobalt, titanium, magnesium, zinc, calcium, copper, manganese, strontium, yttrium, lanthanum, polyaluminum halide, basic aluminum nitrate, hydrolyzed aluminum, aluminum sulfate, zirconyl salts, titanyl salts, and combinations thereof.

In yet other aspects, the barrier inducing treatment may be provided as coating on substantially only the edge of the backing layer, the coating may have a dry weight of at least about 0.15 mg/cm$^2$, the first major surface may be adhesive free and the barrier inducing treatment may be provided as a coating on the first major surface, the barrier inducing treatment may be provided in the adhesive, the barrier inducing treatment may be provided as a coating on the adhesive, the barrier inducing treatment may further comprise a humectant, and/or the barrier inducing treatment further comprises a surfactant.

The humectant may comprise at least one of a polyhydroxy compound or a salt, the polyhydroxy compound may be selected from the group of glycerol, propylene glycol, dipropylene glycol, polypropylene glycol, ethylene glycol, diethylene glycol, triethylene glycol, polyethylene glycol, sorbitol, pantothenol, xylitol, mannitol, erythritol, sucrose, glucose, gluconic acid salts, pyrrolidone carboxylic acid, cationic polyhydroxy compounds, organic salts, inorganic salts, and combinations thereof, and/or the humectant salt may be selected from at least one of an organic compound salts having a molecular weight of less than about 2000, and an inorganic salt.

In other aspects, the coating may be an aqueous suspension, and the barrier inducing treatment may be present in an amount sufficient to cause the suspension to separate and become less uniform, the suspension may be a colloidal dispersion, and the barrier inducing treatment may be present in an amount sufficient to cause the colloidal dispersion to undergo coagulation, the colloidal dispersion may be anionically stabilized, and the barrier inducing treatment may include an average of at least two amine groups per molecule, and/or the coating may include charge-stabilized colloidal particles, and the barrier inducing treatment may have a charge opposite from the charge of the colloidal particles.

In accordance with another aspect, the present disclosure provides a method of forming a smooth and precise boundary between a masked region of a surface to be shielded from a coating, and an unmasked region of a surface to which the coating is applied, the method comprising the steps of adhering the masking article described above to the masked region of the surface, applying the coating to the unmasked region of the surface and at least an edge portion of the masking article, allowing the coating to at least partially dry, and removing the masking article from the surface.

In another embodiment, the present disclosure provides a roll of masking tape for use in conjunction with an aqueous based paint, the roll having opposed side faces defined by corresponding side edges of the tape, wherein at least one of the side edges includes a barrier inducing treatment, wherein the barrier inducing treatment induces separation of the aqueous based paint when the paint comes into contact with the barrier inducing treatment, thereby mitigating the migration of the paint beyond the edge of the masking tape when the tape is applied to a surface.

In other aspects, the barrier inducing treatment may include a water soluble barrier inducing compound, the barrier inducing treatment may cationic, the barrier inducing treatment may be polycationic, barrier inducing treatment may causes a charge-stabilized uniformly dispersed mixture to become a less uniformly dispersed mixture, and/or the charge-stabilized uniformly dispersed mixture may be an anionically charge-stabilized latex emulsion.

In a specific embodiment, the present disclosure provides a masking tape for shielding a protected work surface from an anionic, charge-stabilized, colloidal dispersion, the tape including a crepe paper backing layer having first and second opposed major surfaces and at least one edge, pressure sensitive adhesive on the backing layer second major surface, and cationic material on the edge of the backing layer, wherein the cationic material comprises at least one of an organic compound having an amine equivalent weight of at least about 40 g/equivalent and no greater than about 1000 g/equivalent, and a polyvalent metal cation, and further wherein the cationic material has a water solubility of at least about 0.1 g/100 g water at 23° C., whereby when an anionic, charge-stabilized, colloidal dispersion comes into contact with the water soluble cationic material, the anionic charge-stabilized colloidal dispersion becomes less uniform, and thereby creates a barrier that impedes paint migration in the region between the masking tape and the protected work.

In another embodiment, the present disclosure provides a barrier inducing treatment formulation for use in connection with a masking article, comprising a cationic barrier inducing compound. In various aspects, the barrier inducing treatment formulation may further comprise a humectant, and/or may further comprise a surfactant. In one aspect, the barrier inducing compound may comprise from about 25% to about 75% of the barrier inducing treatment total dry weight, the humectant may comprise from about 25% to about 75% of the barrier inducing treatment total dry weight, and the surfactant may comprise from about 0% to about 10% of the barrier inducing treatment total dry weight. In another aspect, the barrier inducing compound may comprise from about 1% to about 10% of the barrier inducing treatment total wet weight, the humectant may comprise from about 1% to about 10% of the barrier inducing treatment total wet weight, and the surfactant may comprise no greater than about 1% of the barrier inducing treatment total wet weight. In other, more specific aspects, the barrier inducing compound may comprise a water soluble cationic homopolymer, the humectant may comprise glycerin, and/or the surfactant may comprise an ethoxylated acetylenic diol.

In another aspects, the present disclosure provides a method of improving the paint line performance of a masking tape comprising the step of providing a water soluble cationic material on the edge of the masking tape, a method of improving the paint line performance of a masking tape comprising the step of providing a polycationic material on the edge of the masking tape, a method of improving the paint line performance of an adhesive masking article having an edge, and a method comprising the step of providing the edge of the masking article with a water soluble barrier inducing compound, wherein the edge of the treated masking article including the water soluble barrier inducing treatment produces a paint line that has a lower degree of variability around a center line than the masking article produces prior to being treated with the barrier inducing treatment.

In other aspects, the water soluble barrier inducing treatment may be cationic, and/or the step of providing the edge of the masking article with a water soluble barrier inducing treatment may comprise applying a water soluble cationic material to the edge of the masking material.

In another embodiment, the present disclosure provides a method of improving the paint line performance of an adhesive masking article having an edge, the method comprising the step of providing the edge of the masking article with a polycationic barrier inducing treatment, wherein the edge of the masking article including the polycationic barrier inducing treatment produces a paint line that has a lower degree of variability around a center line than the masking article produces prior to being treated with the barrier inducing treatment. In other, more specific aspects, the polycationic barrier inducing treatment may be may include a water soluble barrier inducing compound, and/or the step of providing the edge of the masking article with a polycationic barrier inducing treatment may comprise applying a polycationic material to the edge of the masking material.

In yet another aspect, the present disclosure provides a method of shielding a protected work surface from a coating applied to a surface adjacent the protected work surface, the method comprising the steps of applying a masking article to the work surface to be protected wherein the masking article comprises a backing layer having first and second opposed major surfaces, and at least one edge; and an adhesive on at least a portion of at least one of the first and second backing layer opposed major surfaces, and applying a coating to the work surface protected by the masking article, wherein the coating comprises charge stabilized particles, wherein the masking article comprises a water soluble barrier inducing treatment present on at least the edge of the masking article to contact the coating when the coating contacts the edge of the backing layer, wherein the barrier inducing treatment has a charge opposite that of the charge stabilized particles. In one embodiment, the charge on the charge stabilized particles in the coating may be anionic, and the charge of the barrier inducing treatment may be cationic.

In yet other aspects, the present disclosure provides a method of forming a roll of masking tape having a barrier inducing treatment applied to the edge of the tape for improving the paint line performance of the tape, the method comprising the steps of coating a slitting blade with a barrier inducing treatment, and slitting an untreated roll of masking tape with the slitting blade, thereby applying the barrier inducing treatment to the edges of the slit rolls of tape, a method of forming a roll of masking tape having a barrier inducing treatment applied to the edge of the tape for improving the paint line performance of the tape, the method comprising the step of applying a liquid composition containing a barrier inducing treatment to at least one side face of the finished roll of masking tape, and/or a method of forming a roll of masking tape having a barrier inducing treatment applied to the edge of the tape for improving the paint line performance of the tape, the method comprising the step of vapor depositing a composition comprising a barrier inducing treatment to at least one side face of the roll of masking tape. In other, more specific aspects, the step of vapor depositing may include the vapor phase deposition of a low molecular weight cationic material, the step of vapor depositing may include vapor phase deposition and polymerization of a cationic monomer, and/or the step of vapor depositing includes nitrogen corona discharge treatment, thereby placing amines directly on the side surface of the tape roll.

Advantages of certain embodiments of the present disclosure include providing an adhesive masking article that is easy to manufacture, is easy to use, does not require special packaging, does not involve the use of harmful, hazardous, or toxic materials, has a reduced tendency to tear, or sliver, upon removal, and produces sharp, clean, precise, smooth, even paint lines.

BRIEF DESCRIPTION OF THE DRAWINGS

The present disclosure will be further described with reference to the accompanying drawings in which.

DETAILED DESCRIPTION

Figure 1:
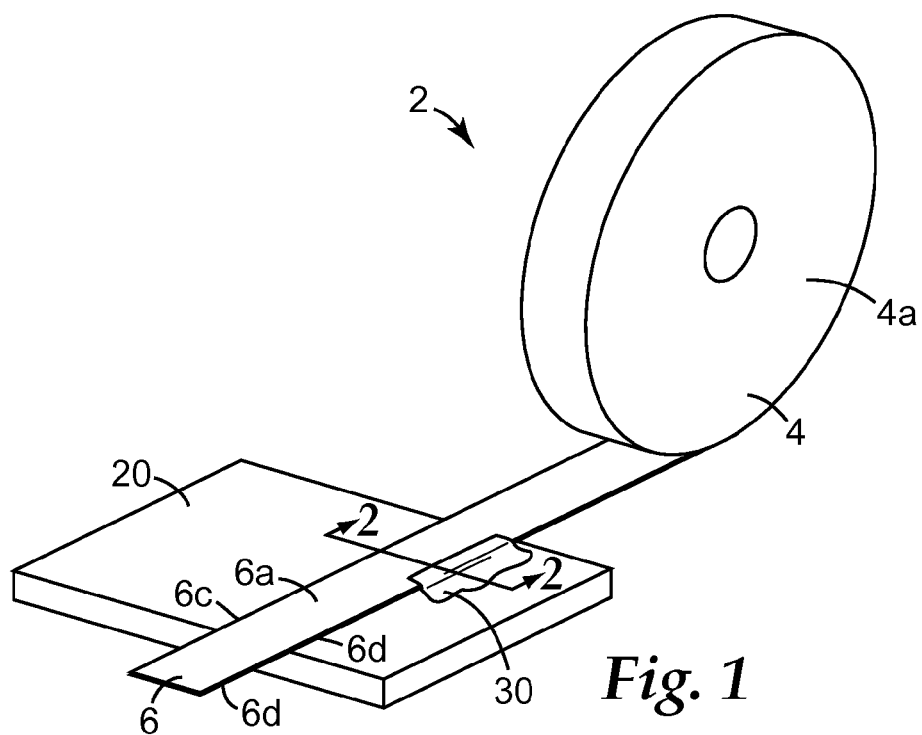
FIG. 1 is a perspective view of a roll of tape having improved paint line performance according to an embodiment of the invention.
Figure 2:
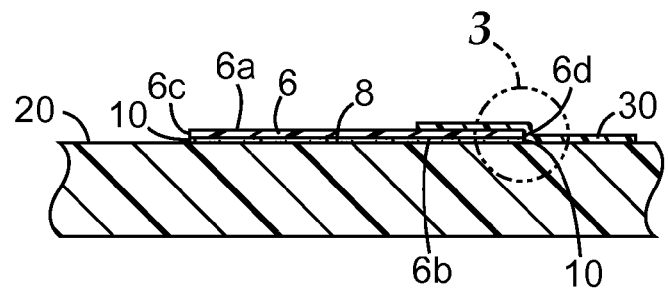
FIG. 2 is a cross sectional view taken along line 2-2 of FIG. 1.
Figure 3:
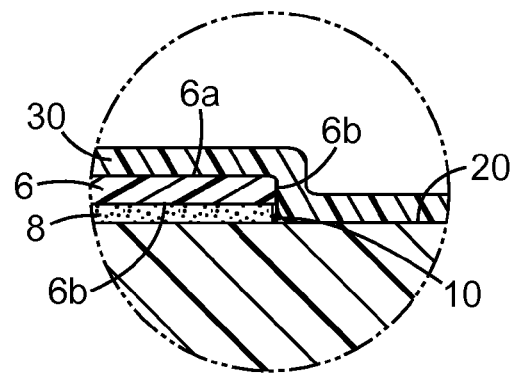
FIG. 3 is an enlarged view of an edge portion of the tape shown in FIG. 2.

Referring now to the drawings, wherein like reference numerals refer to like or corresponding features throughout the several views, FIGS. 1-3 show an adhesive masking article 2 in the form of a roll of tape 4 for protecting a portion of a work surface 20 from a coating 30, such as paint, that is applied to the work surface 20 adjacent to the protected portion of the work surface 20, according to one embodiment of the invention. In a specific end use application, the masking article 2 is used to protect the work surface 20 from a latex paint that is being applied to the work surface 20. As used herein, "latex paint" refers to a water based paint comprising polymeric binder and colorant, such as one or more pigments, as a dispersion in a polar aqueous continuous phase.

In the illustrated embodiment, the masking article 2 is in the form of a roll of tape 4, such as a roll of masking tape. It will be recognized that the masking article 2 may take the form of any conventional masking article including, for example, rolls of masking tape, relatively large sheets of masking material, strips of masking material having any desired length, and die cut masking articles having varied sizes and shapes designed for specific end use applications, any of which may include adhesive or be non-adhesive.

The illustrated masking tape 2 includes a backing layer 6 having first and second opposed major surfaces 6a, 6b, and first and second opposed edges 6c, 6d. The masking tape 4 further includes a layer of adhesive 8 on the second major surface 6b of the backing layer 6.

The particular materials used for the tape backing layer 6 and the adhesive 8 are not critical, and may be selected from any of the materials used in conventional tape constructions. Suitable materials for the backing layer 6 include, for example, paper including both flat or smooth paper as well as textured paper such as crepe paper, natural or synthetic polymer films, nonwovens made from natural and/or synthetic fibers and combinations thereof, fabric reinforced polymer films, fiber or yarn reinforced polymer films or nonwovens, and multiple layer laminated constructions.

Adhesive 8 may be any suitable adhesive as is known in the art. Suitable adhesives include, for example, pressure-sensitive adhesives such as rubber-based adhesives, acrylic-based adhesives, silicone-based adhesives, polyurethane adhesives, block copolymer adhesives, such as those based on Kraton-type polymers formed from blocks of styrene, butadiene, isoprene, and the like, and combinations thereof.

Pressure-sensitive adhesives are recognized as a standard class of materials. Pressure-sensitive adhesives are adhesives, which in dry (i.e., substantially solvent free except for residual solvent) form are tacky at room temperature (e.g., 15° C. to 25° C.) and firmly adhere to a variety of dissimilar surfaces upon mere contact without the need for more than manual pressure. Pressure-sensitive adhesives require no activation by water, solvent or heat in order to exert a strong adhesive holding force towards materials such as paper, cellophane, glass, plastic, wood and metals. Pressure-sensitive adhesives have a sufficiently cohesive holding and elastic nature that, despite their aggressive tackiness, they can be handled with the fingers and removed from smooth surfaces without leaving a substantial residue (see, e.g., Test Methods for Pressure-Sensitive Tapes, 6th Ed., Pressure Sensitive Tape Council, 1953). Pressure-sensitive adhesives and tapes are well known, and the wide range and balance of properties desired in such adhesives has been well analyzed (see, e.g., U.S. Pat. No. 4,374,883; and "Pressure-Sensitive Adhesives" in Treatise on Adhesion and Adhesives Vol. 2, "Materials," R. I. Patrick, Ed., Marcel Dekker, Inc., N.Y., 1969). The various materials and compositions useful as pressure-sensitive adhesives are available commercially and are thoroughly discussed in the literature (see, e.g., Houwink and Salomon, Adhesion and Adhesives, Elsevier Publ. Co., Amsterdam, Netherlands, 1967; Handbook of Pressure-Sensitive Adhesive Technology, Donates Satas, Ed., VanNostrand Reinhold Co., N.Y., 1982).

The adhesive 8 may be a continuous coating or may be pattern coated as described in U.S. Pat. Nos. 4,798,201 and 5,290,615, the entire contents of which are hereby incorporated by reference.

In accordance with a characterizing aspect of one embodiment of the invention, the masking tape 4 includes a barrier inducing treatment 10 on the edges 6c, 6d of the masking tape 4. Provided in this manner (i.e., provided along at least one of the edges 6c, 6d of the masking tape 4), when a coating 30, such as paint, is applied to the work surface 20 and comes into contact with an edge 6c, 6d of the tape 4 adhered to the work surface 20, the coating 30 will also come into contact with the barrier inducing treatment 10. The barrier inducing treatment 10 may be provided in liquid form, solid form, or combinations thereof.

In one aspect, the barrier inducing treatment 10 includes a compound, ingredient, material or agent that upon dissolution into the liquid coating 30 from the edge 6c, 6d of the masking article 2 causes the migration of a liquid coating 30 beyond an edge 6c, 6d of the masking article 2 to be impeded. That is, the barrier inducing compound serves to inhibit the flow of the liquid coating 30 under the masking article 2 and onto the work surface 20 being protected from the coating 30 by the masking article 2. The barrier inducing compound may impede the migration of the liquid coating 30 by, for example, inducing aggregation of particles within the liquid coating 30 along an edge 6c, 6d of the masking article 2, or by increasing the viscosity of the liquid coating 30, both of which mechanisms tend to form a barrier that impedes, or otherwise inhibits, the migration of the coating 30 beyond the edge of the masking article 2.

More specifically, in one aspect, the barrier inducing treatment 10 may include a compound, ingredient, material or agent capable of causing a first component of a mixture to combine with other such components, thereby forming larger associations. The term "mixture" as used herein generally refers to mixtures with uniformly dispersed components, stable mixtures, suspensions, emulsions, dispersions, and/or solutions. In a specific example, the mixture may be a stable mixture with uniformly dispersed components, such as latex paint. In the case of a latex paint, the first component that combines to form larger associations may be polymer dispersion particles. It is believed that by causing the polymer dispersion particles to combine, the barrier inducing compound causes the latex paint to begin to increase in viscosity and/or to form a physical barrier that impedes colloidal paint particles in the paint mixture from passing beyond the treated edge of the masking article.

In another aspect, the barrier inducing treatment may be capable of causing the first component of the mixture to be drawn together and thereby separate from the mixture (i.e., the barrier inducing treatment causes the mixture to stratify or become less uniform). The separation or stratification of the mixture is typically observable to the naked eye. The first component of the mixture may be, for example, solid, semisolid, or liquid particles dispersed in a suspension (i.e., the suspension may be a dispersion or an emulsion), such as an aqueous suspension.

The mixture may be an anionically charged soluble polymer paint mixture including dispersed inorganic pigment particles. In this case, the first component of the paint mixture may be, for example, a polymer that carries an anionic charge.

In a more specific aspect, the barrier inducing compound may be a material that upon contact with and dissolution into a suspension is capable of causing solid, semisolid, or liquid particles dispersed in a suspension to combine to form larger particle associations, or groups of particles. In an even more specific aspect, the barrier inducing compound causes the larger particle associations to combine irreversibly. That is, the combined particles will not return to their uncombined (i.e., separated or dispersed) condition naturally over time, but rather require that some external stimulus be applied to the system to cause the larger particle associations to return to their dispersed, separated, or dissociated, condition. Thus, in certain embodiments, the combined particles cannot be re-dispersed homogenously even with significant input of dispersive energy. The process by which the barrier inducing compound causes particles to combine may be described generally as one or more of the following: aggregation, coalescence, agglomeration, flocculation, coagulation and/or precipitation.

The ability of the barrier inducing treatment 10 to inhibit the migration of the coating 30 beyond an edge 6c, 6d of the masking article 2 will depend, in part, on the nature of the particular coating 30. The coating may be, for example, an aqueous suspension, in which case the barrier inducing treatment 10 will be present in an amount sufficient to induce aggregation or increase the viscosity of the aqueous suspension when the suspension comes into contact with the barrier inducing treatment 10. The coating 30 may include charge-stabilized colloidal particles. In this case, the barrier inducing treatment 10 will have a charge opposite from the charge of the colloidal particles, thereby destabilizing the particles when the coating comes into contact with the barrier inducing treatment 10.

More specifically, the coating 30 may comprise a colloidal dispersion in which the colloidal dispersion is anionically stabilized, such as is the case with latex paint. In this case, in order for the barrier inducing treatment 10 to be effective, it will have a net positive charge. More particularly, if the colloidal dispersion is anionically stabilized, the barrier inducing treatment 10 will generally include, on average, at least two amine groups per molecule, and/or a metal cation having a valence of at least 2. The amine groups may be primary, secondary, tertiary or quaternary amines. Primary, secondary, and tertiary amines may be protonated so they carry a positive charge. Regardless of the particular coating, it is desirable that the barrier inducing treatment 10 be present in an amount sufficient to inhibit the migration of the coating 30 past the edge 6c, 6d beyond the edge of the backing layer 6.

In accordance with another aspect of the invention, by impeding the migration of the coating 30 beyond the edge 6c, 6d of the backing layer 6, the barrier inducing treatment 10 serves to produce paint lines that have a lower degree of variability around a center line than an edge 6c, 6d of the masking article 2 produces if it does not include the barrier inducing treatment 10. That is, all other variable remaining constant, an edge of a masking article provided with the barrier inducing treatment 10 will produce a paint line having a lower degree of variability around a center line than an edge not provided with the barrier inducing treatment. The center line and degree of variability can be determined using known statistical techniques such as the method of least squares, linear regression, and analysis of variance.

In the illustrated embodiment, the barrier inducing treatment 10 may be provided as a layer on the entire side surface 4a of the roll of tape 4. Depending on the effectiveness of the particular barrier inducing treatment 10 used, it has been found that such a layer on the side surface 4a of the roll of tape 4 may have a dry coating weight of at least about 0.15 milligrams per square centimeter ($mg/cm^2$), at least about 0.3 $mg/cm^2$, or at least about 0.5 $mg/cm^2$, and no greater than about 25 $mg/cm^2$, no greater than about 15 $mg/cm^2$, and no greater than about 8 $mg/cm^2$, and a wet coating weight of at least about 3 $mg/cm^2$, at least about 6 $mg/cm^2$, or at least about 9 $mg/cm^2$, and no greater than about 450 $mg/cm^2$, no greater than about 225 $mg/cm^2$, and no greater than about 125 $mg/cm^2$.

While not wishing to be limited in any way, it is believed that the barrier inducing treatment 10 upon contact and dissolution into a paint dispersion serves to disrupt the stability of the paint dispersion, thereby causing the particles in the paint that are in the vicinity of the barrier inducing treatment 10 along at the edge of the tape 4 to combine (e.g., aggregate or agglomerate). It is believed that the combining of the particles in the paint dispersion, in turn, causes a barrier to form between the edge of the tape 4 and the surface 20 to which the tape 4 is adhered. The barrier blocks and seals the tape edge, thereby impeding paint, or components of the paint mixture, from penetrating the tape edge 6d/surface 20 interface. That is, it is believed that the barrier inducing treatment 10 causes the paint to become higher in viscosity and/or form a physical barrier along the edge 6c,6d of the tape 4, and the higher viscosity and/or physical barrier serves to form a blocking region that inhibits paint (or at least the colorant in the paint) from migrating beyond the edge 6c,6d of the tape 4 in the region between the tape 4 and the surface 20 (i.e., the blocking region impedes the flow of paint beneath the tape along the surface 20).

In addition to producing smooth even paint lines, the barrier inducing treatment 10 may also serve to alleviate the potential for tape slivering when the tape 4 is removed from a work surface 20. Again not wishing to be limited in any way, it is believed that tape slivering is generally initiated at, and propagates from, points where paint has penetrated under the tape at the adhesive/substrate interface. By impeding the penetration of paint in this manner, the likelihood of tape slivering is reduced.

In one embodiment, the barrier inducing treatment 10 is water soluble. More specifically, the barrier inducing treatment 10 includes a barrier inducing compound, such as a polymer or metal ion, having a solubility in water of at least about 0.1 grams/100 grams deionized water at 23° C., at least about 0.2 gram/100 grams of deionized water at 23° C., at least about 0.5 gram/100 grams of deionized water at 23° C., at least about 1 gram/100 grams of deionized water at 23° C., at least about 2 grams/100 grams of deionized water at 23° C., at least about 5 grams/100 grams of deionized water at 23° C., at least about 10 grams/100 grams of deionized water at 23° C., and at least about 20 grams/100 grams of deionized water at 23° C., at a pH of 6, as measured according to the test method set forth below. It has been found that barrier inducing treatments including barrier inducing compounds having a solubility in water of at least about 10% by weight, 15% by weight, and 20% by weight are desirable. In other embodiments, the barrier inducing treatment compound may be alcohol soluble, soluble in glycols, or soluble in other humectants that may be present in the edge coating composition.

The solubility of a dry barrier inducing compound may be determined using the following technique. First, the desired concentration of a dry barrier inducing compound is thoroughly mixed with pure deionized water in either a sealed vessel, or round bottom flask with reflux condenser, at a temperature of at least 60° C. for at least 4 hours. The mixture is then allowed to cool to 23-25° C. for at least 24 hours with mixing. It will be noted that for some polymers, the time and temperature may need to be adjusted to greater than 4 hours and/or greater than 60° C., respectively, to ensure that true solubility has been achieved. For example, it may take significantly longer than 4 hours to ensure dissolution of higher molecular weight polymers. In addition, in the case of higher molecular weight polymers, the step of mixing for at least 24 hours at 23-25° C. may need to be carried out for as long as 48 hours. On the other hand, if the compound exhibits a cloud point, then a lower dissolution temperature should be chosen so that the solubility at room temperature can be determined. In addition, care should be taken not to form a supersaturated solution. If it is important to know the solubility limit of the barrier inducing compound, then excess compound should be added, i.e., there should be visible turbidity or visible solid phase after mixing. If, on the other hand, it is simply desired to know if the barrier inducing compound is soluble at a specific value, for example 10% by weight, then a sample is prepared at or slightly greater than 10% by weight. The initial barrier inducing compound of interest must also be dry prior to mixing it with the deionized water to ensure that the initial weight of compound is accurate. A 10 milliliter (ml) fraction of the solubilized mixture is then centrifuged in a 15 ml centrifuge tube at 10,000×g for 30 minutes in order to settle any undissolved fraction. Next, a sample of approximately 5 grams (g) is removed and precisely weighed into a tared glass beaker. This should be done on an analytical balance capable of accurately measuring to at least 0.0002 g. The sample is then dried to a constant weight at a sufficient temperature to thoroughly drive off the water and obtain the pure compound without degradation of the compound. If the compound is susceptible to breakdown, it can be dried by gently sweeping the sample with dry nitrogen. A sample is considered dry when and the water has evaporated and the sample has reached a constant weight. Drying may be carried out in a convection oven at 90° C. making sure that none of the sample is lost due to boiling/bumping etc. Several weights are then measured and recorded to ensure the sample has reached a constant weight. The solubility of the barrier inducing compound is calculated by dividing the weight of pure compound by the initial sample weight and multiplying by 100. Multiple samples may be run, as needed, to ensure that the results are consistent and accurate. The same method may be used to determine the solubility of a dry barrier inducing treatment.

It is desirable that the barrier inducing treatment 10 be in the cationic form ready to be used in the masking article 2. Thus, it is desirable that primary, secondary, and tertiary amines be at least partially protonated with an acid to adjust it to the proper pH. Desirable pH would typically be at least about 4, at least about 5, at least about 6, and at least about 6.5, and no greater than about 9, no greater than about 8, and no greater than about 7.5. Ideally, the pH is adjusted to ensure that at least 10% of the polycationic polymer amines are protonated. This will be dependent on the basicity of the amines present, and can be easily determined by titration.

In one specific embodiment, the masking article 2 includes a polycationic material incorporated into the masking article 2 to contact the coating 30 when the coating 30 contacts an edge 6c, 6d of the backing layer 6. In another embodiment, the masking article 2 includes a material having an amine equivalent weight of at least about 40 g/equivalent, and no greater than about 1000 g/equivalent, incorporated into the masking article 2 to contact the coating 30 when the coating 30 contacts the edge 6c, 6d of the backing layer 6. Suitable polycationic materials have an amine equivalent weight of no greater than about 1000 g/equivalent, no greater than about 500 g/equivalent, and no greater than about 350 g/equivalent.

For the purposes of this disclosure, the amine equivalent weight is taken as the average amine equivalent weight of the polymer normally determined by titration. For quaternary amines, this is the equivalent weight of the ionic form. For primary, secondary, and tertiary amines, this is the equivalent weight of the free amine form as would be determined, for example, by titration. By way of example, polyethylene imine would have an amine equivalent weight of approximately 43 g polymer/equivalent of amine, and polydiallyldimethylammonium chloride would have an amine equivalent weight of 160.5 g polymer/equivalent of amine.

In each of the embodiments described herein, the barrier inducing treatment 10 is present on at least a portion of at least one of the opposed edges 6c, 6d of the backing layer 6. In the illustrated embodiment, the barrier inducing treatment 10 is a coating present as a discrete layer along the edges 6c, 6d of the backing layer 6. To produce continuous paint lines that are sharp, clean, precise, smooth, and/or even, it is desirable that the barrier inducing treatment 10 be present continuously along both opposed edges 6c, 6d of the backing layer 6.

The particular manner in which the barrier inducing treatment 10 is incorporated into the roll 4 is not critical, so long as the barrier inducing treatment 10 is provided along at least a portion of one or both edges 6c, 6d, and is present in an amount sufficient to produce the desired function described herein. For example, the barrier inducing treatment 10 may be incorporated into, or applied onto, the adhesive layer 8, or incorporated into, or applied onto, the backing layer 6. For example, the backing layer 6 may be saturated with the barrier inducing treatment 10, or the barrier inducing treatment 10 may be provided as a layer across the width of the first major surface 6a of the backing layer 6 such that the barrier inducing treatment 10 is present along one or both of the edges 6c, 6d of the backing layer 6, or the barrier inducing treatment 10 may be provided as a discrete layer along substantially only the edges 6c, 6d of the backing layer 6, as illustrated.

The barrier inducing treatment may comprise cationic materials and/or polycationic materials. Suitable cationic materials include polycationic small molecules, polycationic polymers or oligomers having at least 2, at least 4, and at least 6 cationic groups per molecule on average. The polycationic polymers or oligomers may be organic cationic polymers, as well as polysiloxane and organopolysiloxane containing polycationic polymers. The cationic polymers may be linear, branched, or crosslinked. Particularly suitable polycationic polymers include Polyquaternium-6 and Polyquaternium-37 series polymers. A suitable polycationic polymer is a Polyquaternium 6 series polymer available from Nalco Company, Naperville, Ill. under the trade designation Merquat. Merquat Polyquaternium-6 series polymers are highly charged water soluble cationic homopolymers of diallyl dimethyl ammonium chloride.

Polycationic polymers and oligomers may be based on synthetic or natural based polymers, such as polysaccharides and polymers derived from vinyl monomers. For example, cationic modified celluloses, guar gum, starch, proteins, and the like may be suitable. Certain polycationic materials may be surface active and capable of reducing the surface tension of aqueous compositions significantly, e.g., to less than 45 dyne/cm at a concentration of 0.5% by weight or less.

More specifically, suitable cationic polymers may comprise a polyquaternary amine polymer, a polyfunctional protonated primary, secondary, tertiary amine, and combinations thereof. Other suitable cationic polymers comprise at least one of poly(diallyldimethylammonium salt), protonated or quaternized homo- or copolymer of an amine functional acrylic monomer, and protonated polyethylene imine. Suitable amine functional acrylic monomers include acrylates, methacrylates, acrylamides and methacrylamides. More specific vinyl monomers include, for example, diallyldimethylammonium salt, methacryloyloxyalkyl trialkyl ammonium salt, acryloyloxyalkyl trialkyl ammonium salt, quaternized dialkylaminoalkylacrylamidine salt, trialkylaminoalkyl acrylate and methacrylate salts, dialkyldiallyl ammonium salts (e.g., dimethyldiallylammonium salts), acrylamidoalkyltrialkyl salts, methacrylamidoalkyltrialkyl salts, and alkyl imidazolinium salts.

In another embodiment, the barrier inducing treatment may comprise a cationic saline. For example, protonated primary, secondary, tertiary silanes, as well as quaternary silanes, may be applied to the edge of the masking article alone or in combination with non-ionic silanes to provide an effective barrier inducing treatment. Examples of suitable aminoalkyl alkoxysilanes and aminoalkyl acyloxysilanes, which contain secondary amino groups, include N-phenylaminopropyl-trimethoxysilane available as A-9669 from OSI Specialties, Sistersville, W. Va., bis-(.gamma.-trimethoxysilylpropyl)amine available as A-1170 from OSI Specialties, N-cyclohexylaminopropyl-triethoxysilane, N-methylaminopropyl-trimethoxysilane, N-butylaminopropyl-trimethoxysilane, N-butylaminopropyl-triacyloxysilane, 3-(N-ethyl)amino-2-methylpropyl-trimethoxysilane, 4-(N-ethyl)amino-3,3-dimethylbutyl-trimethoxysilane and the corresponding alkyl diethoxy, alkyl dimethoxy and alkyl diacyloxysilanes, such as 3-(N-ethyl)amino-2-methylpropyl-methyldimethoxysilane.

Examples of suitable aminoalkyl alkoxysilanes and aminoalkyl acyloxysilanes containing primary amino groups include 3-aminopropyl-triacyloxysilane, 3-aminopropyl-methyldimethoxysilane; 6-aminohexyl-tributoxysilane; 3-aminopropyl-trimethoxysilane; 3-aminopropyl-triethoxysilane; 3-aminopropyl-methyldiethoxysilane; 5-aminopentyl-trimethoxysilane; 5-aminopentyl-triethoxysilane; 4-amino-3,3-dimethyl-butyl-trimethoxysilane; and 3-aminopropyl-triisopropoxysilane. 3-amino-propyl-trimethoxysilane and 3-aminopropyl-triethoxysilane are particularly preferred.

Examples of suitable quaternary ammonium silanes include trimethylaminopropyltrimethoxysilane salts, trimethoxysilyl)-propyldimethyloctadecylammonium chloride, and the like.

Such silanes will hydrolyze and condense to form cationic polysiloxane oligomers, polymers and crosslinked networks. They may be applied as silanes, hydrolysis products, oligomers, or polymers. Such silanes may be used in combination with cationic polymers and/or multivalent metals.

Counter ions of the cationic barrier inducing treatments may be any that are suitable including, for example, halides, carboxylates, and the like. Particularly suitable are those salts that promote solubility and, in particular, rapid hydration upon contact with the paint. Thus, suitable counter ions may comprise hydroxyl or other polar groups in addition to the anionic portion to promote hydration.

Other useful cationic polymers are described in U.S. Pat. No. 5,908,619 (Scholz) and U.S. Pat. No. 6,582,711 (Asmus, et. al.), the entire contents of which are hereby incorporated by reference.

In another embodiment, the barrier inducing treatment 10 may comprise an inorganic compound. Suitable inorganic compounds include, for example, polycationic (i.e., polyvalent) metal compounds. Suitable polyvalent metal compounds may comprise a metal salt or compound that will dissolve in a solvent comprising water to generate a cation carrying a cationic charge of at least two. The metal salt may comprise a soluble salt of aluminum, iron, zirconium, chromium, cobalt, titanium, magnesium, zinc, calcium, copper, manganese, strontium, yttrium, lanthanum, polyaluminum halide, basic aluminum nitrate, hydrolyzed aluminum, aluminum sulfate, zirconyl salts, titanyl salts, and combinations thereof. Suitable metal salts typically have a solubility in water of at least about 0.1 grams/100 grams of deionized water at 23° C., at least about 1 gram/100 grams of deionized water at 23° C., and at least about 5 grams/100 grams of deionized water at 23° C.

The barrier inducing treatment 10 may also include combinations of organic materials, such as a cationic oligomer or polycationic polymer, and inorganic materials, such as a polyvalent metal cation.

The barrier inducing compound may comprise from at least about 1% by dry weight, at least about 5%, at least about 10%, or at least about 15%, to no greater than about 95% by dry weight, no greater than about 85% by weight, no greater about 75%, or no greater than about 65% of the dried barrier inducing treatment formulation.

The barrier inducing treatment 10 may optionally include a humectant. Suitable humectants may comprise polyhydroxy and/or ionic group containing compounds, or organic or inorganic salts separate and distinct from any salt that may be present as part of the polycationic compound(s) in the barrier inducing treatment 10. Suitable polyhydroxy compounds include, for example glycerol, propylene glycol, dipropylene glycol, polypropylene glycol, ethylene glycol, diethylene glycol, triethylene glycol, polyethylene glycol, sorbitol, pantothenol, xylitol, mannitol, erythritol, sucrose, glucose, gluconic acid salts, pyrrolidone carboxylic acid, acetamide MEA, lactamide MEA, organic salts, inorganic salts, and combinations thereof. Particularly suitable organic salts typically have a molecular weight of less than about 2000. Examples of suitable organic salts include ColaMoist 200 (Hydroxypropyl Bis-Hydroxyethyldimonium Chloride), and ColaMoist 300P (PolyQuaternium-71), available from Colonial Chemical, Inc. South Pittsburg, Tenn., and Incromectant AQ—acetamidopropyl trimmonium chloride, and Incromectant LQ—lactamidopropyl trimmonium chloride, available from Croda, Inc. Edison, N.J. Humectants may be present in the dried barrier inducing treatment composition from at least about 0% by dry weight, at least about 5%, or at least about 15%, to no greater than about 95% by dry weight, no greater than about 85% by weight, or no greater than about 75%.

The barrier inducing treatment 10 may also optionally include a surfactant. As used herein, the term "surfactant" refers to an amphiphile (i.e., a molecule possessing both polar and nonpolar regions which are covalently bound) capable of reducing the surface tension of water and/or the interfacial tension between water and an immiscible liquid. Suitable surfactants may be cationic, nonionic, or amphoteric. Combinations of surfactants may also be used, if desired.

Suitable surfactants may be selected from the group consisting of poloxamer (polyethylene oxide/polypropylene oxide block copolymers), cationic surfactants, zwitterionic surfactants, and mixtures thereof. Cationic, amphoteric, and non-ionic surfactants and, in particular, ethylene oxide/propylene oxide surfactants, such as poloxamers, are particularly suitable.

One or more surfactants may be included in the various barrier inducing treatment compositions described herein at a suitable level to produce the desired result. In one embodiment, the surfactants are present in a total amount of at least about 0.01 wt-%, at least about 0.05 wt-%, or at least about 0.075 wt-%, based on the total weight of the ready to use barrier inducing treatment coating composition. In the dried composition the surfactant will represent about 0-30% by weight, or about 1-25% by weight of the dried coating of the barrier inducing treatment.

Exemplary cationic surfactants include, but are not limited to, salts of optionally polyoxyalkylenated primary, secondary, or tertiary fatty amines; quaternary ammonium salts such as tetraalkylammonium, alkylamidoalkyltrialkylammonium, trialkylbenzylammonium, trialkylhydroxyalkylammonium, or alkylpyridinium having compatible anionic counter ions such as halides (preferably chlorides or bromides) or alkyl sulfates, such as methosulfate or ethosulfate, as well as other anionic counter ions; imidazoline derivatives; amine oxides of a cationic nature (e.g., at an acidic pH), and mixtures thereof.

In certain embodiments, useful cationic surfactants are selected from the group consisting of tetralkyl ammonium, trialkylbenzylammonium, alkyl amine oxides, and alkylpyridinium halides, and mixtures thereof.

Suitable amphoteric surfactants include those having tertiary amine groups, which may be protonated, as well as quaternary amine containing zwitterionic surfactants. Specific examples of such amphoteric surfactants include ammonium carboxylate amphoterics, such as alkyl betaines, as well as ammonium sulfonate amphoteric surfactants which are often referred to as "sultaines" or "sulfobetaines".

Exemplary nonionic surfactants include, but are not limited to, alkyl glucosides, alkyl polyglucosides, silicone copolyols, polyhydroxy fatty acid amides, sucrose esters, esters of fatty acids and polyhydric alcohols, fatty acid alkanolamides, ethoxylated fatty acids, ethoxylated aliphatic acids, ethoxylated fatty alcohols (e.g., octyl phenoxy polyethoxyethanol available under the trade designation TRITON X-100 and nonyl phenoxy poly(ethyleneoxy)ethanol available under the trade designation NONIDET P-40, both from Sigma Aldrich Corp, St. Louis, Mo.), ethoxylated and/or propoxylated aliphatic alcohols, such as those available under the trade designation Brij from ICI Americas, Chicago, Ill., ethoxylated glycerides, ethoxylated/propoxylated block copolymers, such as the Pluronic and Tetronic surfactants available from BASF, Chicago, Ill., ethoxylated cyclic ether adducts, ethoxylated amide and imidazoline adducts, ethoxylated amine adducts, ethoxylated mercaptan adducts, ethoxylated condensates with alkyl phenols, ethoxylated nitrogen-based hydrophobes, ethoxylated polyoxypropylenes, polymeric silicones, fluorinated surfactants, such as those available under the trade designations FLUORAD-FS 300 from 3M Company, St. Paul, Minn., and ZONYL available from Dupont de Nemours Co., Wilmington, Del., and polymerizable (reactive) surfactants, such as SAM 211 (alkylene polyalkoxy sulfate) surfactant available under the trade designation MAZON from PPG Industries, Inc., Pittsburgh, Pa. In certain embodiments, the nonionic surfactants useful in the compositions of the present invention are selected from the group consisting of Poloxamers, such as PLURONIC from BASF, sorbitan fatty acid esters, and mixtures thereof. A particularly suitable surfactant is Dynol 604 surfactant available from Air Products and Chemicals, Inc. Allentown, Pa.

It will be understood that certain compounds in the barrier inducing treatment formulation may serve more than one function. For example, certain compounds may serve as both a polycationic barrier inducing compound and as a humectant, or as both a barrier inducing compound and as a surfactant. For the purposes of this disclosure, if a particular compound is polycationic, it is considered to be part of the barrier inducing compound(s).

The barrier inducing treatment 10 may include other optional additives such as corrosion inhibitors, buffers, dyes, pigments, emulsifiers, antioxidants, viscosifiers (i.e., thickeners), additional solvents, plasticizers, and/or preservatives.

To use the masking article 2 to produce sharp, clean, smooth lines of separation between a masked region of a surface 20, which is shielded from a coating, and an unmasked region of a surface to which the coating 30 is applied, the masking article 2 is first adhered to the region of the surface 20 to be shielded from the coating 30. Next, the coating 30 is applied to the unmasked region of the surface 20 and applied to at least the edge of the masking article 2. The coating 30 is then allowed to at least partially dry. Last, the masking article 2 is removed from the surface 20. Because the barrier inducing treatment 10 inhibits the migration of the coating 30 beyond the edge 6c, 6d of the masking article 2, a clear even line of demarcation is produced between the coated region of the surface and the region shielded from the coating 30 by the masking article 2.

An adhesive masking article 2 including a barrier inducing treatment 10 according to one embodiment of the invention may be produced using a variety of techniques. For example, the barrier inducing treatment 10 may be incorporated into the masking article via the adhesive 8, either by mixing the barrier inducing treatment 10 into the adhesive 8, or by applying a coating of the barrier inducing treatment 10 to selected surfaces of the adhesive 8 using known coating techniques. The barrier inducing treatment 10 may also be incorporated into the masking article 2 via the backing 6. This may include, for example, saturating the entire backing layer 6 with the barrier inducing treatment 10, or coating selected portions of the backing layer 6 with the barrier inducing treatment 10 using known coating techniques. The selected portions of the backing layer 6 may include one or both opposed major surfaces 6a, 6b, and/or one or both edges 6c, 6d.

According to a specific method, in which the masking article 2 is a roll of tape, the method of forming the roll of tape 4 having a barrier inducing treatment 10 applied to the edges 6c, 6d of the tape, thereby improving the paint line performance of the tape, includes the steps of: 1) coating a slitting blade with the barrier inducing treatment 10, and 2) slitting an untreated roll of masking tape with the slitting blade, thereby transferring the barrier inducing treatment 10 to the cut edges of the roll of tape 4 during the slitting of the tape roll.

According to another method, a liquid composition containing a barrier inducing treatment is applied to at least one side face of the finished roll of masking tape. This may be accomplished using a number of techniques including roll coating, pad coating, spraying, and vapor depositing a composition comprising a barrier inducing treatment on at least one side surface of the roll of masking tape. Vapor deposition may include the vapor phase deposition of a low molecular weight cationic material, the vapor phase deposition and polymerization of a cationic monomer, or ammonia plasma treatment that place amines directly on the side surface of the tape roll. The barrier inducing treatment may also be applied manually to the sides of a finished roll of tape using, for example, a sponge or other suitable applicator.

According to another method, a liquid barrier inducing treatment composition may be applied to the edge of the masking article, such as the side face of a finished roll of masking tape, immediately prior to use. For example, the liquid barrier inducing treatment composition may be applied via a liquid impregnated applicator pad. In this embodiment, a kit including at least a roll of masking tape and a barrier inducing treatment composition may be supplied. Alternatively still, the liquid barrier inducing treatment composition may be sold separately (i.e., separate from the masking article), whereby an end user can apply the composition to at least one edge of a masking article prior to use.

In order that the invention described herein can be more fully understood, the following examples are set forth. It should be understood that these examples are for illustrative purposes only, and are not to be construed as limiting this invention in any manner.

EXAMPLES

Unless otherwise noted, all parts, percentages, ratios, etc. in the Examples and the rest of the specification are by weight.

Materials

LUPASOL P is a low viscosity, high molecular weight (average 750,000 MW) ethylenimine polymer (supplied as a 50% aqueous solution) having primary, secondary, and tertiary amine groups and a very high cationic charge once protonated, available from BASF Corporation, Florham Park, N.J.

LUPASOL WF is a medium molecular weight (average 25,000 MW) ethylenimine polymer having primary, secondary, and tertiary amine groups and a cationic charge once protonated, available from BASF Corporation, Florham Park, N.J.

Polydiallyldimethylammonium chloride is a polyquaternium polymer available from Sigma Aldrich, Milwaukee, Wis. Three molecular weights were used: "low MW" which has a reported MW of 100,000-200,000; "medium MW" which has a reported MW of 200,000-350,000; and "high MW" which has a reported MW of 400,000-500,000.

DIAFORMER Z-731 is a poly(amine oxide acrylate copolymer), (supplied as 40% active material in a 50% ethanol/10% water solvent system), available from Clariant Corporation, Mt. Holly, N.C. At lower pH this polymer behaves as a polycationic polymer.

COSMOCIL CQ is a poly(hexamethylene biguanide) hydrochloride (supplied as a 20% aqueous solution), available from Arch Chemicals, Inc., Norwalk, Conn.

N-[3-(Trimethoxysilyl)propyl]ethylenediamine is available from Sigma Aldrich (Product No. 104884), Milwaukee, Wis.

DYNOL 604 is a nonionic surfactant available from Air Products, Allentown, Pa.

Sorbitol is available from Sigma Aldrich, Milwaukee, Wis.

Glycerin/glycerol is available from Sigma Aldrich, Milwaukee, Wis.

Aluminum Chlorohydrate is available from Sigma Aldrich, Milwaukee, Wis.

Aluminum Chloride is available from Sigma Aldrich, Milwaukee, Wis.

Calcium Carbonate is available from Sigma Aldrich, Milwaukee, Wis.

Paint Line Performance Test Method

Preparation of Glass Panels:

The non-Sn (non-Tin) side of a new 8 inch by 12 inch glass panel was identified using a black light. The non-Sn side of the glass panel was then cleaned with one wipe each of diacetone alcohol, heptane, and ethanol (in the stated order).

Tape Application and Paint Line Testing:

An 8 inch long strip of the treated tape was gently applied by hand to the glass panel. A 4.5 pound calibrated rubber roller was centered horizontally relative to the width of the tape and the roller was passed lengthwise back and forth by hand two times, for a total of four individual passes over the tape at a rate of approximately 12 inches per minute for a total of four passes. Within 15 minutes of applying the tape sample to the panel, a paint brush was used to apply paint over the glass panel and the treated tape. The painted test panels were then allowed to dry at room temperature. The paint used for the test was Sun Proof Exterior House & Trim Semi-Gloss Latex 100% Acrylic black paint (#78-851, available from Pittsburgh Paints, PPG Industries, Pittsburgh, Pa.). Three replicates of each tape sample were tested. Approximately 15 feet of tape was removed from the tape roll between each test sample. For comparison, glass panels with control tapes having no edge treatment were also prepared. After the paint was completely dry, the paint line performance for the tapes was evaluated by visually examining the paint lines on the glass relative to the control tapes having no edge treatment. The results were rated as "No Improvement", "Improvement" or "Significant Improvement" as indicated in the Table.

Barrier Inducing Treatment and Application Procedures

The barrier inducing treatment compositions that were evaluated are provided in the Table. The barrier inducing treatments were applied to the edge or side surface of a finished roll of tape (SCOTCH— BLUE PAINTER'S TAPE #2090, available from 3M Company, St. Paul, Minn.) either as an aqueous based solution, as an aqueous based heterogeneous mixture (i.e., not dissolved, and needed to be shaken in order to apply to tape surface), or as 100% solids using the procedures described in the following Examples. If there was a pH adjustment for any of the Examples it is indicated in the Table.

Examples 1-4 and 8-26

A barrier inducing treatment solution was applied to the tape roll edge (i.e., to the side surface) using a sponge applicator, ensuring that the barrier inducing treatment was applied to the entire side of the tape roll. The treated tape roll was then dried in an oven at 150° F. for 15 minutes (coated side facing upwards) and was allowed to cool to room temperature. The barrier inducing treatment solution was then applied to the edge (i.e., to the side surface) on the opposite side of the tape roll using a sponge applicator, ensuring that the material was applied to the entire side of the tape roll. The treated tape roll was then dried in an oven at 150° F. for 15 minutes (second coated side facing upwards). The treated tape roll was then allowed to cool to room temperature prior to testing for paint line performance as described above. Results are provided in the Table.

Examples 5-7

A barrier inducing treatment solution was syringe applied and rubber applicator leveled onto one side of the tape roll edge or side surface at 1 ml (1 gram) loadings. The treated tape roll was then allowed to air dry at room temperature for 4 hours (Example 5) or 24 hours (Example 6) prior to testing for paint line performance as described above.

Example 27

The tape rolls were warmed in an oven at 150° F. for 5 minutes. The tape roll edge or side surface was pressed into the barrier inducing treatment powder, ensuring that the powder was applied to the entire side surface of the tape roll. The excess powder was then brushed off of the tape roll edge/side surface using a dry brush. This procedure was repeated to coat the edge/side surface on the opposite side of the tape roll. The samples were then tested for paint line performance as described above. Results are provided in the Table.

Comparative Examples C1 and C2

Comparative Examples C1 and C2 were prepared in manner similar to the tape rolls that were solution coated as described above except that the treatment was applied as a heterogeneous mixture (i.e., the calcium carbonate was not dissolved, and the mixture needed to be shaken in order to apply it to the edge or side surface of the tape roll.)

TABLE

| Example | Barrier Inducing Treatment Composition | pH | Application Method | Paint Line Performance | | |
|---|---|---|---|---|---|---|
| | | | | No Improvement | Improvement | Significant Improvement |
| 1 | 5% LUPASOL P, 5% Glycerin, remainder Water | 6.9[1] | Solution | | | X |
| 2 | 5% LUPASOL WP, 5% Glycerin, remainder Water | 6.9[1] | Solution | | | X |
| 3 | 5% LUPASOL P, remainder Water | 6.7[2] | Solution | | | X |
| 4 | 5% LUPASOL WP, remainder Water | 6.7[2] | Solution | | | X |
| 5 | 15% COSMOCIL CQ, 0.1% DYNOL 604 Surfactant, 84.9% Water | | Solution | | | X |
| 6 | 25% COSMOCIL CQ, 5% Glycerin, 0.1% DYNOL 604 Surfactant, 69.9% Water | | Solution | | | X |
| 7 | 4% N-[3-(Trimethoxysilyl)propyl]ethylenediamine, 4.8% Water, 91.2% Ethanol | 4.9[2] | Solution | | | X |
| 8 | 12.5% DIAFORMER Z-731, 10% Isopropanol, 77.5% Water | 2.0[3] | Solution | | | X |
| 9 | 12.5% DIAFORMER Z-731, 0.25% DYNOL 604 Surfactant, 87.25% Water | 2.0[3] | Solution | | | X |
| 10 | 12.5% DIAFORMER Z-731, 10% Isopropanol, 77.5% Water | 2.0[3] | Solution | | | X |
| 11 | 12.5% DIAFORMER Z-731, 0.25% DYNOL 604 Surfactant, 87.25% Water | 2.0[3] | Solution | | | X |
| 12 | 5% Polydiallyldimethylammonium chloride, remainder Water | | Solution | | | X |
| 13 | 5% Polydiallyldimethylammonium chloride, 5% Glycerin, remainder Water | | Solution | | | X |
| 14 | 5% Polydiallyldimethylammonium chloride (low MW), 5% Glycerol, 10% Isopropanol, 80% Water | | Solution | | | X |
| 15 | 5% Polydiallyldimethylammonium chloride (low MW), 5% Glycerol, 0.25% DYNOL 604 Surfactant, 89.75% Water | | Solution | | | X |
| 16 | 5% Polydiallyldimethylammonium chloride (low MW), 7% Sorbitol, 10% Isopropanol, 78% Water | | Solution | | | X |
| 17 | 5% Polydiallyldimethylammonium chloride (low MW), 7% Sorbitol, 0.25% DYNOL 604 Surfactant, 87.75% Water | | Solution | | | X |
| 18 | 5% Polydiallyldimethylammonium chloride (medium MW), 5% Glycerol, 10% Isopropanol, 80% Water | | Solution | | | X |
| 19 | 5% Polydiallyldimethylammonium chloride (medium MW), 5% Glycerol, 0.25% DYNOL 604 Surfactant, 89.75% Water | | Solution | | | X |
| 20 | 5% Polydiallyldimethylammonium chloride (medium MW), 7% Sorbitol, 10% Isopropanol, 78% Water | | Solution | | | X |
| 21 | 5% Polydiallyldimethylammonium chloride (medium MW), 7% Sorbitol, 0.25% DYNOL 604 Surfactant, 87.75% Water | | Solution | | | X |
| 22 | 5% Polydiallyldimethylammonium chloride (high MW), 5% Glycerol, 10% Isopropanol, 80% Water | | Solution | | | X |
| 23 | 5% Polydiallyldimethylammonium chloride (high MW), 5% Glycerol, 0.25% DYNOL 604 Surfactant, 89.75% Water | | Solution | | | X |
| 24 | 5% Polydiallyldimethylammonium chloride (high MW), 7% Sorbitol, 10% Isopropanol, 78% Water | | Solution | | X | |

TABLE-continued

| Example | Barrier Inducing Treatment Composition | pH | Application Method | Paint Line Performance | | |
|---|---|---|---|---|---|---|
| | | | | No Improvement | Improvement | Significant Improvement |
| 25 | 5% Polydiallyldimethylammonium chloride (high MW), 7% Sorbitol, 0.25% DYNOL 604 Surfactant, 87.75% Water | | Solution | | X | |
| 26 | Aluminum chlorohydrate | | 100% Solids | | | X |
| 27 | 8.63% Aluminum Chloride (19% solids), 4% Glycerin, 0.1% DYNOL 604 Surfactant, 87.3% Water | 4.4[4] | Solution | | | X |
| C1 | 5% Calcium Carbonate, 10% Isopropanol, 85% Water | | Mixture | X | | |
| C2 | 5% Calcium Carbonate, 0.25% DYNOL 604 Surfactant, 94.75% Water | | Mixture | X | | |

[1] pH was adjusted with hydrochloric acid (HCl)
[2] pH was adjusted with lactic acid
[3] pH was adjusted with sulfuric acid
[4] pH was adjusted with acetic acid Note:
The weight percents indicated in the Table are those of the material as supplied by the vendor. For example, in Example 8, the DIAFORMER Z-731 is supplied as a 40% solids solution, so 12.5% at 40% solids would be a 5% of the polymeric amine oxide.

Persons of ordinary skill in the art may appreciate that various changes and modifications may be made to the invention described above without deviating from the inventive concept. Thus, the scope of the present invention should not be limited to the structures described in this application, but only by the structures described by the language of the claims and the equivalents of those structures.

What is claimed is:

1. An adhesive masking article for shielding a protected work surface from a coating applied to a surface adjacent the protected work surface, the masking article comprising:
   (a) a backing layer having first and second opposed major surfaces, and at least one edge;
   (b) an adhesive on at least a portion of at least one of the first and second backing layer opposed major surfaces; and
   (c) a barrier inducing treatment comprising a polymeric water soluble cationic barrier inducing compound present on at least the edge of the masking article configured to contact the coating when the coating comes into contact with the edge of the backing layer and shield the protected work surface from the coating applied to the surface adjacent the protected work surface.

2. A masking article as defined in claim 1, wherein the barrier inducing compound has a solubility in water of at least about 0.1 grams/100 grams of deionized water at 23° C.

3. A masking article as defined in claim 1, wherein the barrier inducing compound comprises a cationic material comprising a compound having at least one of 2 amine groups, a metal cation having a valency of at least 2, and a combination thereof.

4. A masking article as defined in claim 3, wherein the cationic material has an amine equivalent weight of at least about 40 g/equivalent, and no greater than about 1000 g/equivalent.

5. A masking article as defined in claim 3, wherein the cationic material comprises a polyvalent metal cation.

6. A masking article as defined in claim 1, wherein the barrier inducing compound comprises an organic compound.

7. A masking article as defined in claim 1, wherein the barrier inducing compound further comprises a cationic oligomer.

8. A masking article as defined in claim 7, wherein the cationic polymer comprises an organic polymer.

9. A masking article as defined in claim 1, wherein the barrier inducing treatment comprises an inorganic compound.

10. A masking article as defined in claim 9, wherein the inorganic compound comprises a polyvalent metal compound.

11. A masking article as defined in claim 10, wherein the polyvalent metal compound comprises a metal salt.

12. A masking article as defined in claim 11, wherein the metal salt comprises a soluble salt of aluminum, iron, zirconium, chromium, cobalt, titanium, magnesium, zinc, calcium, copper, manganese, strontium, yttrium, lanthanum, polyaluminum halide, basic aluminum nitrate, hydrolyzed aluminum, aluminum sulfate, zirconyl salts, titanyl salts, and combinations thereof.

13. The masking article of claim 1, the polymeric water soluble cationic barrier inducing compound comprising a polyquaternary amine polymer.

14. The masking article of claim 1, the polymeric water soluble cationic barrier inducing compound selected from the group consisting of Polyquaternium-6 and Polyquaternium-37.

* * * * *